(No Model.)

T. F. FARRELL.
TRIPOD.

No. 497,779. Patented May 23, 1893.

WITNESSES:
Walter Thompson.
Duncan M. Robertson.

INVENTOR:
Thomas F. Farrell
BY
Gartner & Co
ATTORNEYS

UNITED STATES PATENT OFFICE.

THOMAS F. FARRELL, OF NIAGARA FALLS, NEW YORK.

TRIPOD.

SPECIFICATION forming part of Letters Patent No. 497,779, dated May 23, 1893.

Application filed December 6, 1892. Serial No. 454,217. (No model.)

*To all whom it may concern:*

Be it known that I, THOMAS F. FARRELL, a citizen of the United States, residing at Niagara Falls, county of Niagara, and State of New York, have invented certain new and useful Improvements in Tripods; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention relates to an improvement in tripods or supports for rock drills and similar mining machinery and has for its object the construction of said tripods or supports in such a manner, that the device supported may be quickly and easily placed in varying positions.

It consists particularly in the arrangement and construction of the shaft and legs of the tripod and in their method of connection with each other.

It consists also in the combination and arrangement of parts hereinafter described and claimed.

Figure 1:
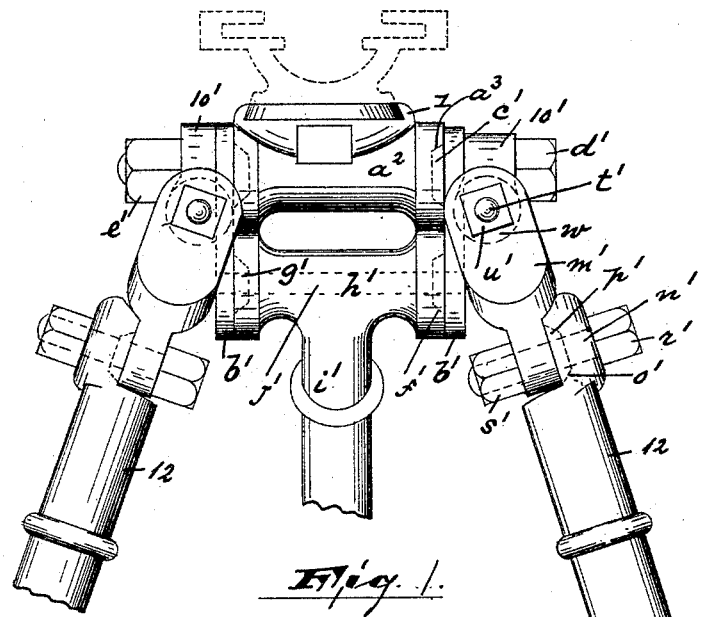
Figure 2:
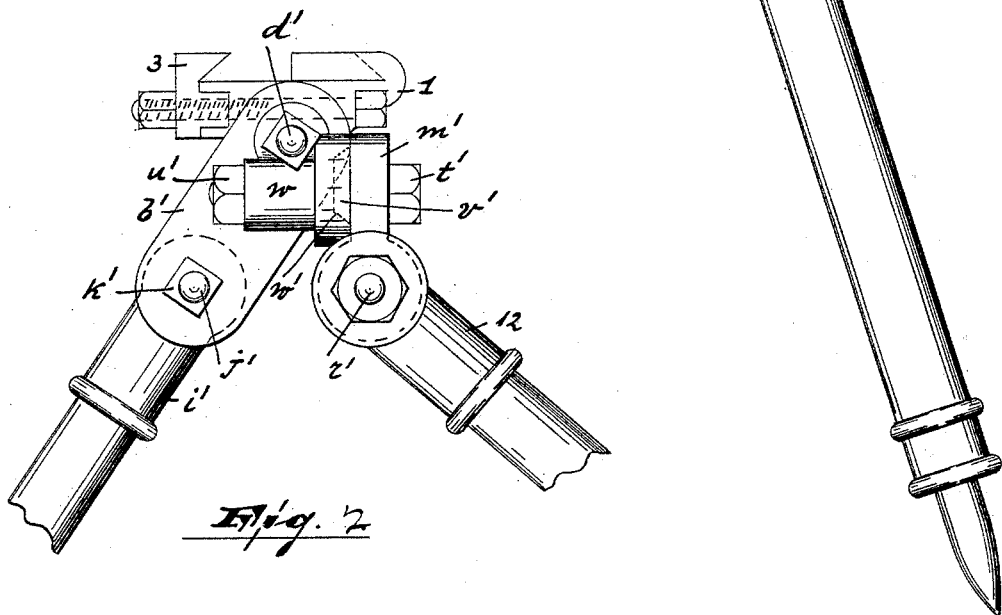

In the drawings Figure 1 is a front elevation of the improved tripod, and Fig. 2, a side elevation thereof.

In the drawings 1 represents the circular top plate of the tripod, which is provided at one side with an upwardly beveled projection or flange 2, adapted to engage the beveled mounting plate of the device to be supported. At the opposite side of the plate 1 is arranged a clamping block 3, operated by bolt 4 and nut 5, and adapted to adjustably secure the mounting plate within the top plate 1 and to clamp it fast thereto. Cast integral with the top plate is a sleeve $a^2$ having at its ends conical recesses $a^3$, adapted to receive the conical projections or bearings $c'$ of the arms $b'$. A bolt $d'$ and its tightening nut $e'$ serve to adjustably secure the arms $b'$ to said sleeve $a^2$. The free ends of the arms $b'$ are provided with conical projections $g'$ which fit into the conical recesses $f'$ in the sleeve $h'$, which carries the rear leg holder $i'$. A tightening bolt $j'$ and its nut $k'$ serve to adjustably secure said sleeve $h'$ and arms $b'$ together.

Secured to the outer face of the end of the arms $b'$ by the bolt $d'$ and its nut $e'$ is a link 10', which consists of two disk like portions integral with each other, the lower portion $w$ extending at approximately right angles to the upper or to that portion of the link 10', which is secured to said arms $b'$. This lower portion $w$ has a conical recess $w'$ within which the conical bearing $v'$ on the upper end of a similar link $m'$ is adjustably secured by the tightening bolt $t'$ and its nut $u'$. The lower end of link $m'$ extends outward at approximately right angles to the upper end, and has on its surface a conical projection $p'$ fitting into the conical recess $o'$ of the upper disk shaped end $n'$ of the front leg holder 12. The link $m'$ and disk $n'$ are adjustably secured together by the tightening bolt $r'$ and nut $s'$.

It is manifest, that the arrangement of the conical bearings and recesses may be reversed in the several parts without departing from the spirit of my invention, as for instance the sleeve $h'$ may have conical projections and the arms $b'$, conical recesses, &c.

The advantages of the present construction of tripod are many. Among these advantages may be mentioned, simplicity, durability and cheapness and particularly the fact, that the front legs of the tripod have each three motions independent of each other, that is, one around the bolt $d'$, one around the bolt $t'$, and the third around the bolt $r'$, (Fig. 2.)

Having thus described my invention, what I claim as new, and desire to secure by Letters Patent, is—

1. The combination in a tripod, of a shaft, having integral therewith the top plate adapted to support the device, a sleeve carrying the rear leg holder, arms connecting by bolts said shaft and sleeve together, and a series of links bolted to each other and connecting the front leg holders to said shaft, all arranged, so that the front leg holders have independent motions in two directions on said links and an independent motion about said shaft, substantially as described.

2. In a tripod, a shaft having at each end a conical depression, an arm provided at both ends with conical projections, one of which is adapted to enter the conical recess of said shaft, said arm being adjustably secured to said shaft by tightening bolts passing through said conical projections and recesses, a sleeve carrying the rear leg holder and having at either end a conical recess adapted to receive the other conical projection on said arm, said arm and sleeve being adjustably secured together by a tightening bolt passing through said recesses and projections, in combination with a compound link provided at each end with conical projections, the upper one of which is adapted to enter a conical recess in the outer face of the upper end of said arm and to be secured adjustably therein by a tightening bolt, and the lower conical projection of said compound link being adapted to enter a conical recess in the upper end of each front leg holder and adjustably secured therein by tightening bolts, said compound link having its upper and lower portions provided with a conical recess and projection respectively, adapted to be secured adjustably by a tightening bolt, substantially as described.

In testimony that I claim the foregoing I have hereunto set my hand this 30th day of November, 1892.

THOMAS F. FARRELL.

Witnesses:
ALFRED GARTNER,
WM. D. BELL.